United States Patent
Yudenfriend et al.

(10) Patent No.: US 11,055,015 B2
(45) Date of Patent: Jul. 6, 2021

(54) FINE-GRAIN ASYNCHRONOUS MIRRORING SUPPRESSION

(71) Applicant: International Business Machines Corporation, Armonk, NY (US)

(72) Inventors: Harry M. Yudenfriend, Poughkeepsie, NY (US); John R. Paveza, Morgan Hill, CA (US); Peter G. Sutton, Lagrangeville, NY (US); Tan Q. Nguyen, San Jose, CA (US); Gerard M. Dearing, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/385,675

(22) Filed: Apr. 16, 2019

(65) Prior Publication Data

US 2020/0333960 A1 Oct. 22, 2020

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01)

(58) Field of Classification Search
CPC ......... G06F 3/065; G06F 3/0604; G06F 3/067
See application file for complete search history.

(56) References Cited

U.S. PATENT DOCUMENTS

| | | | |
|---|---|---|---|
| 8,401,999 B2 | 3/2013 | Petruzzo | |
| 8,850,073 B1 | 9/2014 | Wilkes | |
| 8,909,996 B2 | 12/2014 | Srinivasan et al. | |
| 2002/0065810 A1* | 5/2002 | Bradley | G06F 16/1794 |
| 2005/0076041 A1* | 4/2005 | Stakutis | G06F 16/148 |
| 2010/0281213 A1* | 11/2010 | Smith | G06F 3/0689 |
| | | | 711/114 |
| 2013/0080394 A1 | 3/2013 | Petruzzo | |

OTHER PUBLICATIONS

Anonymously, "Load-balanced Redundant Asynchronous Mirroring Support for Hyperswap," IP.com Publication No. IPCOM000196358D, Jun. 1, 2010.
Anonymously, "A method to recover from a RAID rebuild failure on the fly," IP.com Publication No. IPCOM000234059D, Jan. 9, 2014.

(Continued)

*Primary Examiner* — Eric Cardwell
(74) *Attorney, Agent, or Firm* — Nelson and Nelson; Daniel P. Nelson (57) ABSTRACT

A method for suppressing data mirroring between a primary storage system and a secondary storage system is disclosed. In one embodiment, such a method includes defining a data class with an attribute designed to suppress mirroring of data from a primary storage system to a secondary storage system. The method assigns a data set to the data class, thereby causing the data set to inherit the attribute. In certain embodiments, assigning the data set to the data class includes recording the attribute in one or more of a volume-table-of-contents (VTOC) and a catalog used to reference the data set. The method automatically suppresses mirroring of the data set from the primary storage system to the secondary storage system in accordance with the assigned attribute. A corresponding system and computer program product are also disclosed.

20 Claims, 8 Drawing Sheets

(56) References Cited

OTHER PUBLICATIONS

Anonymously, "A method to mirror host new modified data with minimum storage space for remote copy suspension," IP.com Publication No. IPCOM000235428D, Feb. 27, 2014.
Westphal, Axel, et al., "DS8000 Copy Services", IBM, available at: http://www.redbooks.ibm.com/redbooks/pdfs/sg248367.pdf, Mar. 2017.
Sun Microsystems, "Configuring and Maintaining a Storage Array Using the Command Line Interface," available at: https://docs.oracle.com/cd/E23944_01/pdf/E23976-01.pdf, May, 2011.

* cited by examiner

FINE-GRAIN ASYNCHRONOUS MIRRORING SUPPRESSION

BACKGROUND

Field of the Invention

This invention relates to systems and methods for suppressing the mirroring of data between a primary storage system and a secondary storage system.

Background of the Invention

In asynchronous data replication environments such as z/OS Global Mirror (also referred to as "XRC") and Global Mirror, data is asynchronously mirrored from a primary storage system to a secondary storage system to maintain two consistent copies of the data. The primary and secondary storage systems may be located at different sites, perhaps hundreds or even thousands of miles away from one another. In the event an outage occurs at the primary storage system, host I/O may be redirected to the secondary storage system, thereby enabling continuous operations. When the outage is corrected or repaired at the primary storage system, host I/O may be redirected back to the primary storage system.

In asynchronous data replication environments, some data sets, such as those containing production data, are critical and need to be mirrored from a primary storage system to a secondary storage system to maintain two consistent copies of the data. For example, some data sets may contain critical database tables associated with a relational database. Other data sets may be less critical and/or not needed to recover from a disaster occurring at a primary storage system. For example, the primary storage system may store temporary data sets such as sort-work data sets that are created for the purpose of reorganizing tables in a relational database.

Unfortunately, in asynchronous data replication environments such as Global Mirror, data sets may be mirrored from a primary storage system to a secondary storage system without regard to the importance of the underlying data. This may consume valuable bandwidth between the primary storage system and the secondary storage system. In certain cases, this problem may be solved by creating pools of storage (i.e., groups of logical volumes) on a primary storage system that are not mirrored to a secondary storage system. These pools may be used to store less critical or temporary data. However, this technique is inefficient and adds complexity to managing data on the primary storage system, both in terms of managing the size of the pools and ensuring that production data is not inadvertently stored in such pools.

In view of the foregoing, what are needed are systems and methods to suppress mirroring less critical or temporary data sets between a primary and secondary storage system.

SUMMARY

The invention has been developed in response to the present state of the art and, in particular, in response to the problems and needs in the art that have not yet been fully solved by currently available systems and methods. Accordingly, the invention has been developed to provide systems and methods to suppress data mirroring between a primary and secondary storage system. The features and advantages of the invention will become more fully apparent from the following description and appended claims, or may be learned by practice of the invention as set forth hereinafter.

Consistent with the foregoing, a method for suppressing data mirroring between a primary storage system and a secondary storage system is disclosed. In one embodiment, such a method includes defining a data class with an attribute designed to suppress mirroring of data from a primary storage system to a secondary storage system. The method assigns a data set to the data class, thereby causing the data set to inherit the attribute. In certain embodiments, assigning the data set to the data class includes recording the attribute in one or more of a volume-table-of-contents (VTOC) and a catalog used to reference the data set. The method automatically suppresses mirroring of the data set from the primary storage system to the secondary storage system in accordance with the assigned attribute.

A corresponding computer program product and system are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Figure 1:
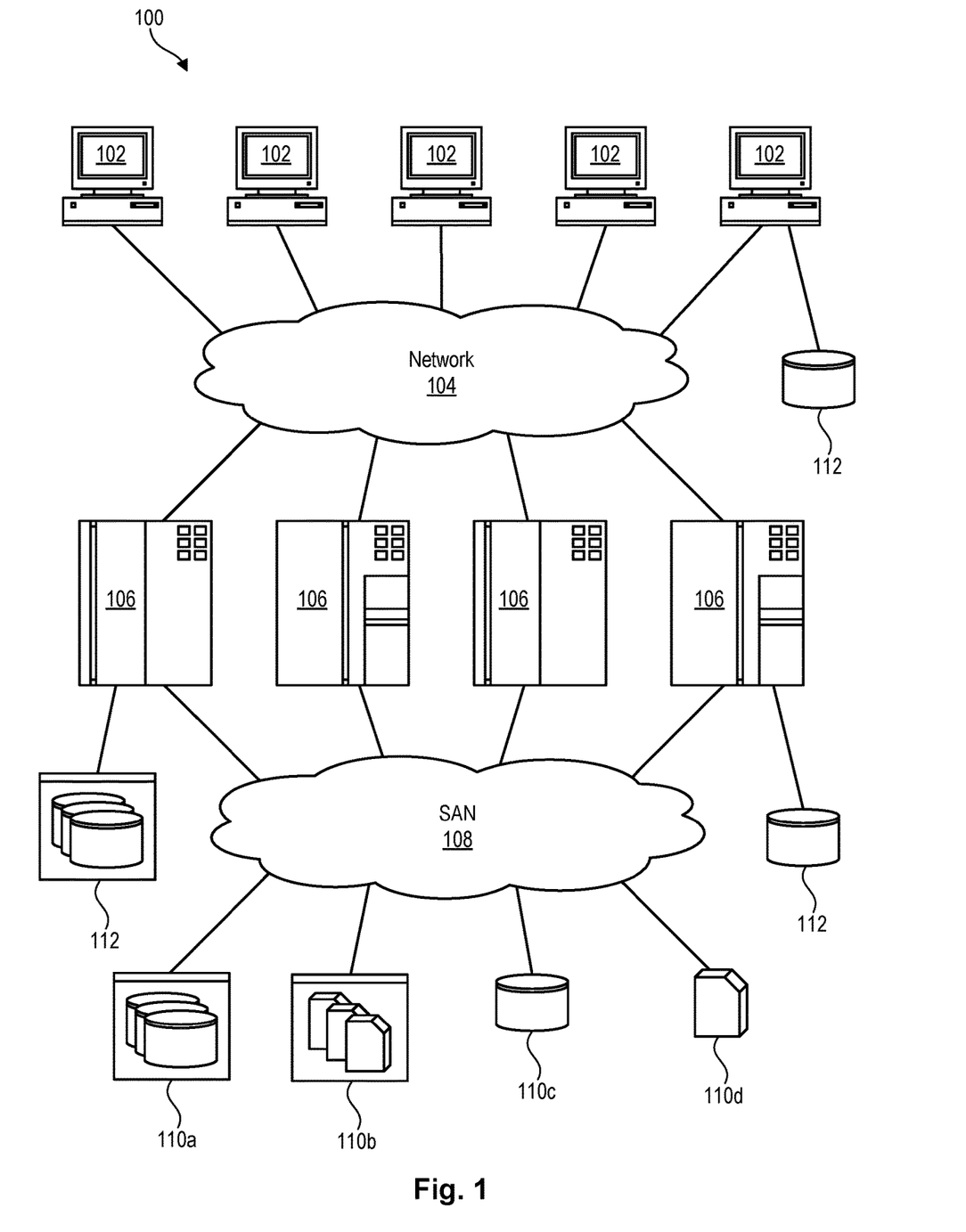
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
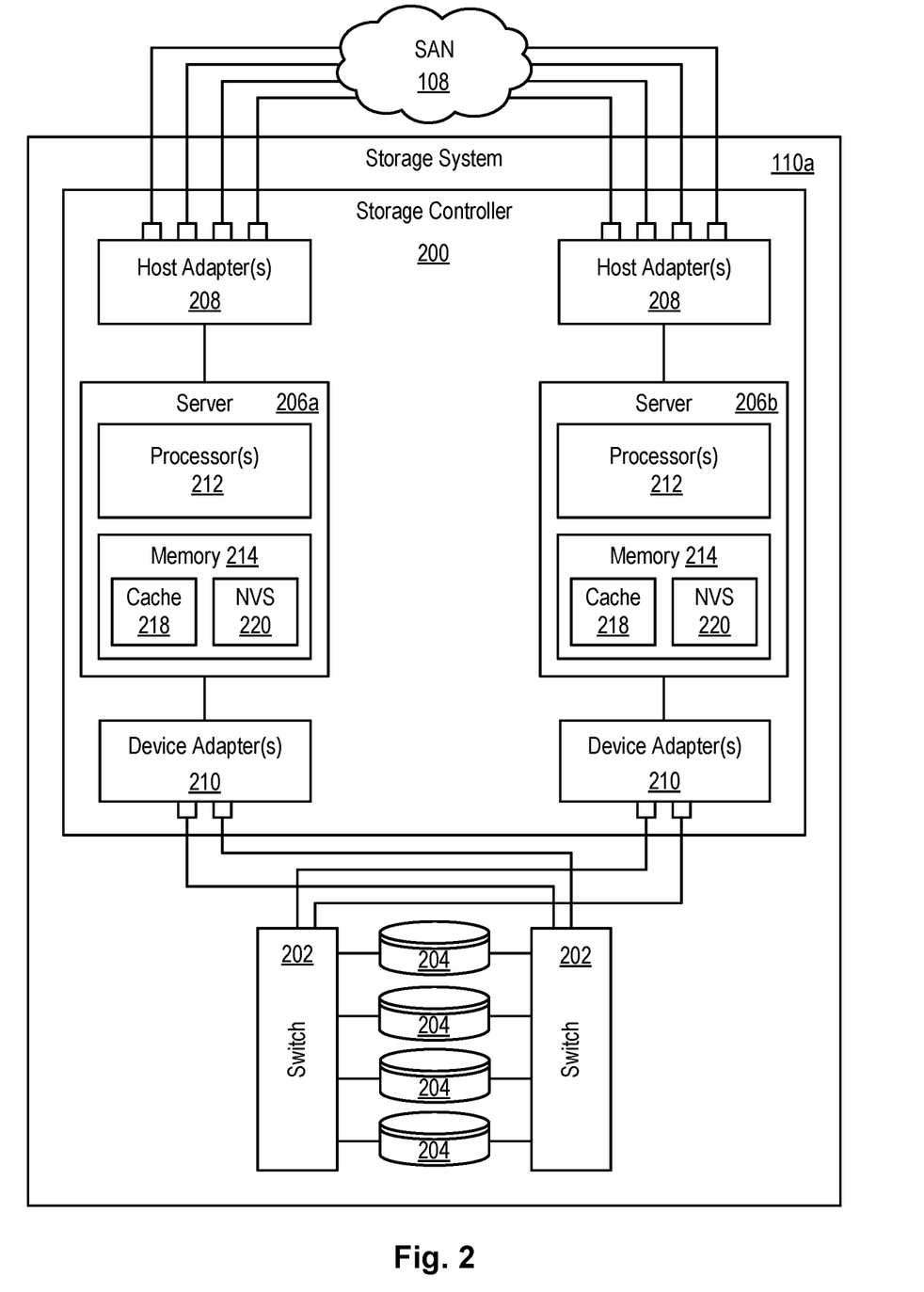
FIG. 2 is a high-level block diagram showing one example of a storage system for use in the network environment of FIG. 1.
Figure 3:
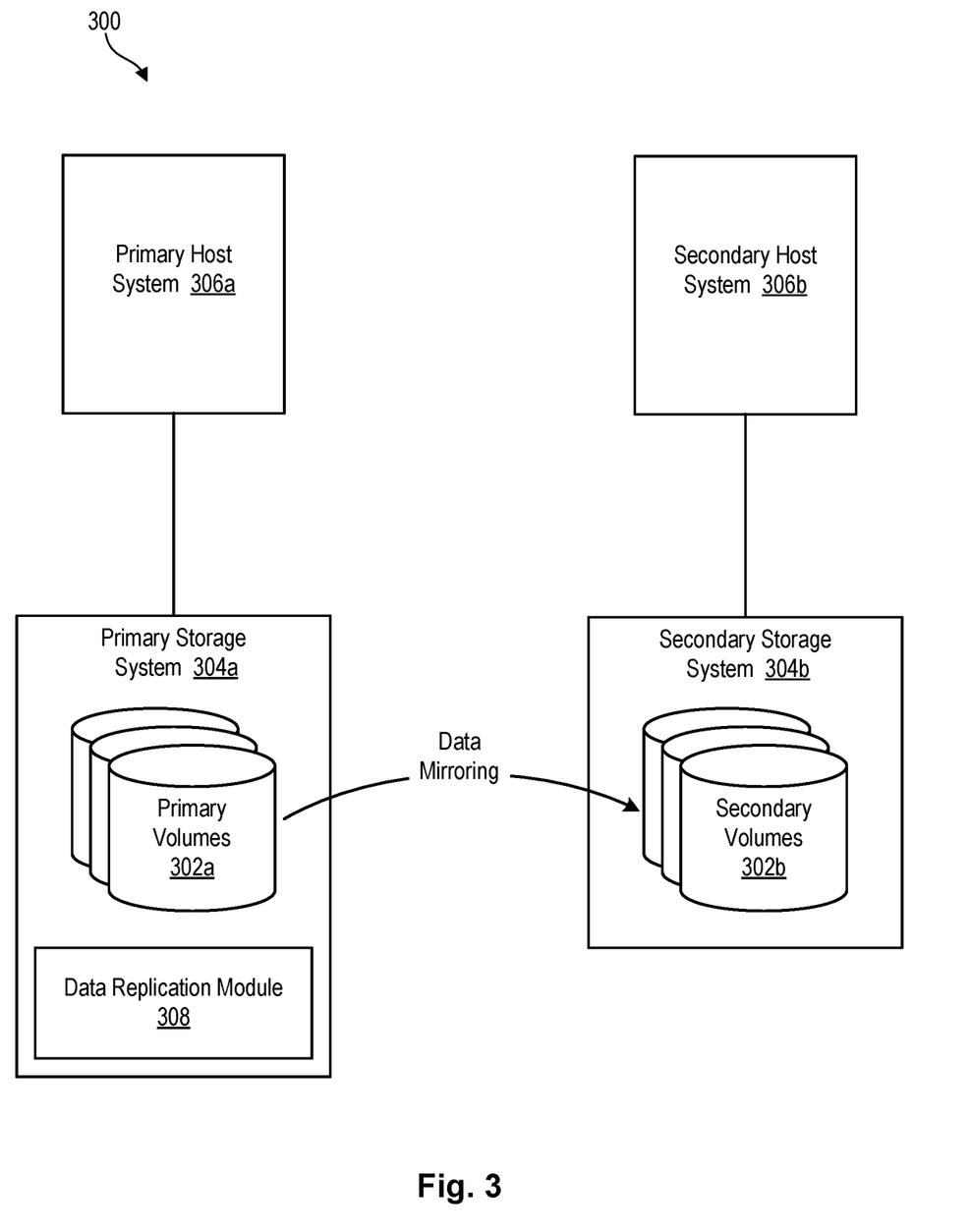
FIG. 3 is a high-level block diagram showing an example of an asynchronous data replication environment.

Referring to FIG. 2, one embodiment of a storage system 110a containing an array of storage drives 204 (e.g., hard-disk drives and/or solid-state drives) is illustrated. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204. The storage drives 204 may, in certain embodiments, be configured in RAID arrays of various RAID levels to provide desired levels of I/O performance and/or data redundancy. Logical volumes 302 (as shown in FIG. 3) may be carved from these RAID arrays.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 include one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes 302 in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Referring to FIG. 3, in certain embodiments the host systems 106 and storage systems 110a described in FIGS. 1 and 2 may be used in a data replication environment, such as an asynchronous data replication environment 300. As previously mentioned, in asynchronous data replication environments such as z/OS Global Mirror (also referred to hereinafter as "XRC") and Global Mirror, data is mirrored from a primary storage system 304a to a secondary storage system 304b to maintain two consistent copies of the data. The primary and secondary storage systems 304a, 304b may each be a storage system 110a such as that illustrated in FIG. 2. The primary and secondary storage systems 304a, 304b may be located at different sites, perhaps hundreds or even thousands of miles away from one another. In the event an outage occurs at the primary site, host I/O may be redirected to the secondary storage system 304b, thereby enabling continuous operations. When the outage is corrected or repaired at the primary site, host I/O may be redirected back to the primary storage system 304a.

FIG. 3 is a high-level block diagram showing an asynchronous data replication environment such as a Global Mirror environment. Using Global Mirror, functionality (referred to herein as a data replication module 308) within the primary storage system 304a may be used to directly mirror data from primary volumes 302a, located on the primary storage system 304a, to secondary volumes 302b, located on the secondary storage system 304b.

In an asynchronous data replication environment 300 such as that illustrated in FIG. 3, some data sets, such as those containing production data, are critical and need to be mirrored from a primary storage system 304a to a secondary storage system 304b to maintain two consistent copies of the data. For example, some data sets may contain critical database tables associated with a relational database. Other data sets may be temporary or less critical. These data sets may not be needed to recover from a disaster occurring at a primary site. For example, the primary storage system 304a may store temporary data sets such as sort-work data sets that are created for the purpose of reorganizing tables in a relational database.

Unfortunately, in some asynchronous data replication environments 300, data sets may be mirrored from a primary storage system 304a to a secondary storage system 304b without regard to the importance of the underlying data. This may consume valuable bandwidth between the primary storage system 304a and secondary storage system 304b. In certain cases, this problem may be solved by creating pools of storage (i.e., groups of logical volumes 302) on a primary storage system 304a that are not mirrored to a secondary storage system 304b. These pools may be used to store less critical or temporary data. However, this technique is inefficient and adds complexity to managing data on the primary storage system 304a, both in terms of managing the size of the pools and ensuring that production data is not inadvertently stored in such pools.

Figure 4:
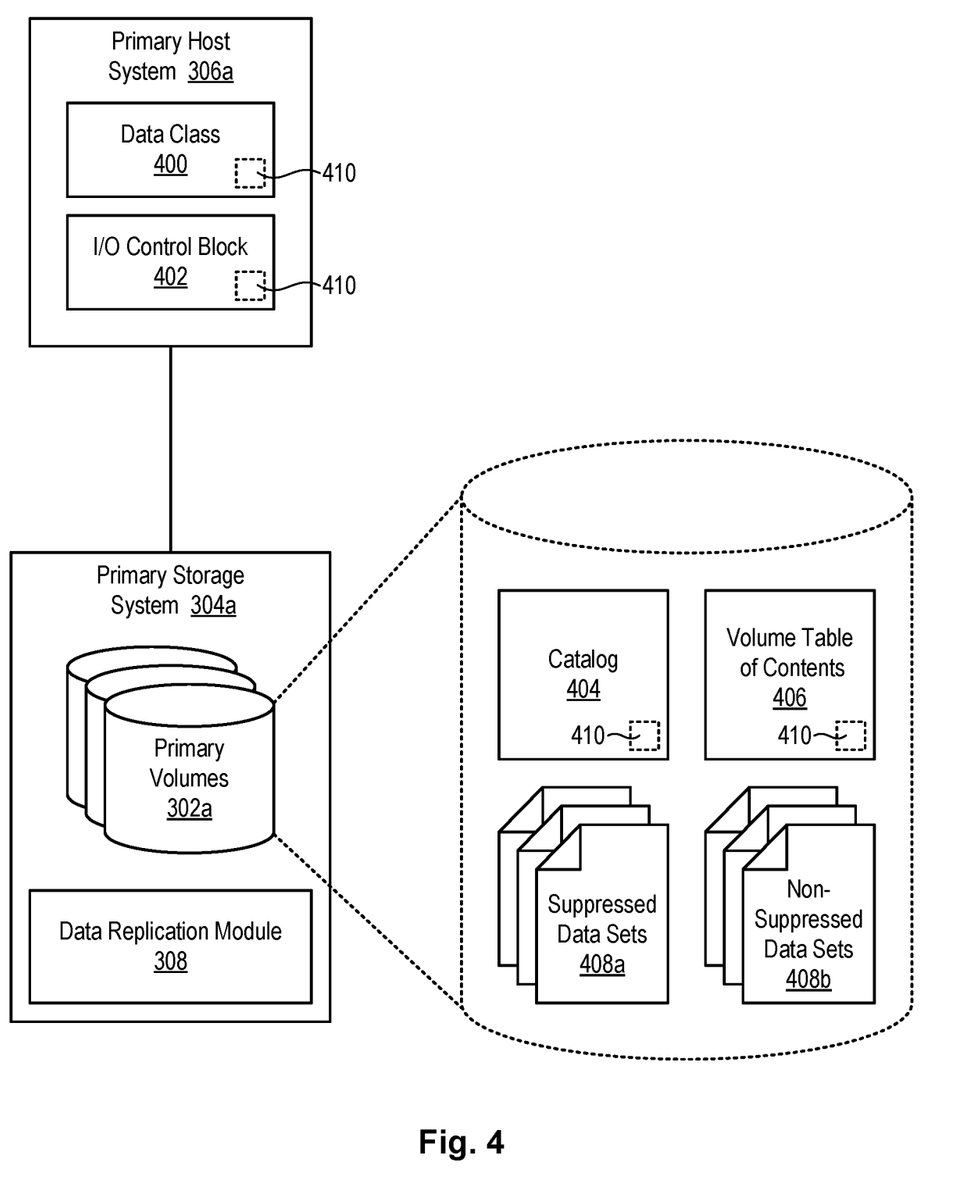
FIG. 4 is a high-level block diagram showing various data structures that may be involved in suppressing data mirroring for selected data sets.

Referring to FIG. 4, in certain embodiments, functionality may be provided to suppress the mirroring of selected data sets 408 (e.g., temporary or less critical data sets 408) from a primary storage system 304a to a secondary storage system 304b. This functionality may provide an improved way to suppress data mirroring for selected data sets 408. This functionality may also reduce the need to isolate, in different volumes 302 or storage pools, data sets 408 containing production data from data sets 408 containing temporary or less critical data. FIG. 4 is a high-level block diagram showing various data structures that may be utilized to suppress mirroring of selected data sets 408 from a primary storage system 304a to a secondary storage system 304b.

In certain embodiments, a data class 400 may be established to suppress mirroring of data from a primary storage system 304a to a secondary storage system 304b. This data class 400 may act as a template for newly allocated data sets 408 and include an attribute 410 that is set to suppress the mirroring of data from a primary storage system 304a to a secondary storage system 304b. When a data set 408 is allocated using the data class 400, the data set 408 may inherit the attribute 410 from the data class 400. That is, the data set 408 may inherit the attribute 410 that suppresses mirroring of the data set 408 from the primary storage system 304a to the secondary storage system 304b. Such a data set 408 may be referred to hereinafter as a "suppressed data set 408a." Data sets 408 that do not have the attribute 410 may be referred to as "non-suppressed data sets 408b."

The attribute 410 may be recorded for a suppressed data set 408a in various ways depending on the type of data set 408 that is involved (e.g., whether the suppressed data set 408a is a VSAM or non-VSAM data set 408, for example). In certain embodiments, the attribute 410 may be recorded for the suppressed data set 408a in a volume table of contents 406 (VTOC 406) that describes the contents of the volume 304 on which the suppressed data set 408a is stored. In other embodiments, the attribute 410 may be recorded for the suppressed data set 408a in a catalog 404 that describes data set attributes and the volume 302 on which the suppressed data set 408a resides. This catalog 404 may be stored on the same or a different volume 304 than that used to store the suppressed data set 408a.

When a suppressed data set 408a is opened by the primary host system 306a to access data therein, the attribute 410 may be identified by the host system 306 in the catalog 404 and/or VTOC 406. This attribute 410 may be imported or recorded in an I/O control block 402 that is created in memory of the primary host system 306a. This I/O control block 402 may be used by the primary host system 306a when performing I/O to the open data set 408a.

Figure 5:
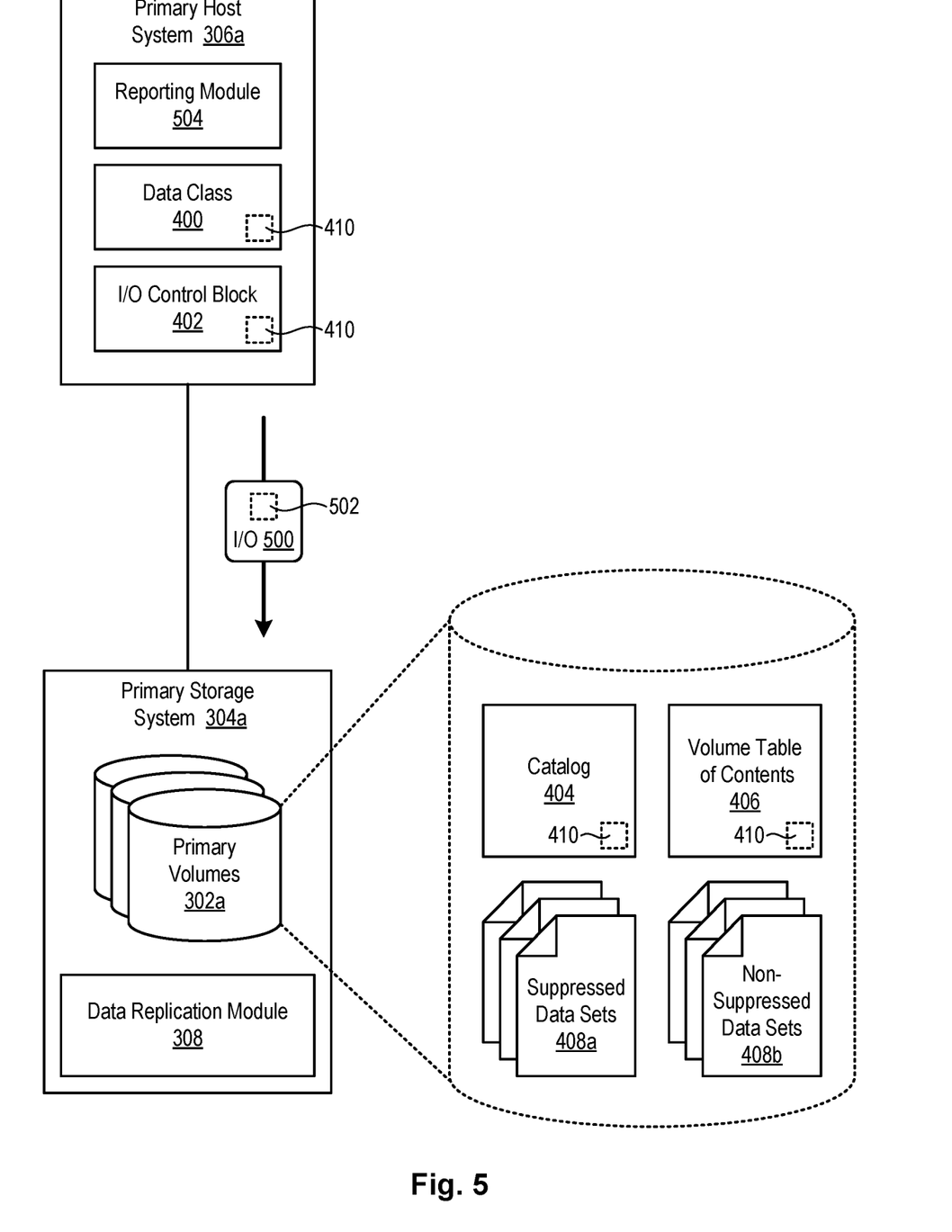
FIG. 5 is a high-level block diagram showing transmission of an I/O request with data mirroring suppressed for associated write data.

Referring to FIG. 5, when the primary host system 306a issues I/O to the primary storage system 304a, the primary host system 306a may check the I/O control block 402 for presence of the attribute 410. As previously discussed, this attribute 410 may indicate that the data set 408a to which the primary host system 306a is issuing I/O is a suppressed data set 408a. Accordingly, the primary host system 306a may take actions to ensure that any data that is written to the suppressed data set 408a is not mirrored to the secondary storage system 304b. In certain embodiments, this may be accomplished by setting a flag 502 or other indicator 502 in write requests 500 directed to the suppressed data set 408a to indicate that the write data is not to be mirrored to the secondary storage system 304b. Upon receiving such a write request 500, the primary storage system 304a may write the associated data to the primary volumes 302a without mirroring the write data to the secondary volumes 302b.

In certain embodiments, a reporting module 504 may be provided on the primary host system 306a or another system to record statistics associated with the suppression of writes from the primary storage system 304a to the secondary storage system 304b. For example, the reporting module 504 may track and report how many write requests have been suppressed over a given period of time. Alternatively or additionally, the reporting module 504 may track and report what percentage of writes of an overall number of writes have been suppressed. These statistics may indicate how much bandwidth is being preserved or saved between the primary storage system 304a and secondary storage system 304b as a result of suppressing data mirroring for certain data sets 408a.

Figure 6:
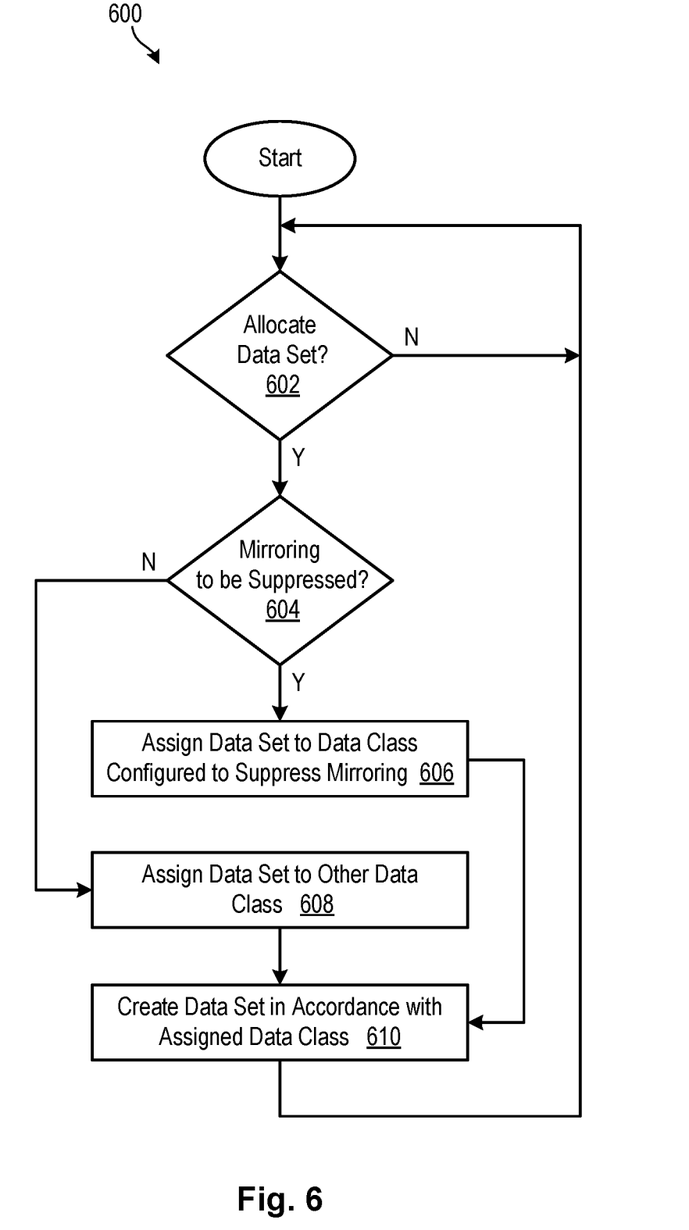
FIG. 6 is a flow diagram showing one embodiment of a method for allocating a data set for which data mirroring is to be suppressed.

FIG. 6 is a flow diagram showing one embodiment of a method 600 for allocating a data set 408a for which data mirroring will be suppressed. This method 600 may, in certain embodiments, be executed by a host system 306 when allocating new data sets 408. As shown, the method 600 initially determines 602 whether a new data set 408 needs to be allocated. If so, the method 600 determines 604 whether data mirroring is to be suppressed for the data set 408. If so, the method 600 assigns the data set 408a to a data class 400 that is configured to suppress data mirroring. As previously explained, this may cause the data set 408a to inherit an attribute 410 from the data class 400 that suppresses data mirroring. The data set 408a may then be created 610 in accordance with the selected data class 400. Upon creating 610 the data set 408, the attribute 410 may be recorded in a VTOC 406 and/or catalog 404 that references the data set 408.

If, at step 604, the method 600 determines that the data set 408 will not have data mirroring suppressed, the method 600 may assign 608 the data set 408 to another data class that does not suppress data mirroring. The method 600 may then create 610 the data set 408 in accordance with the assigned data class.

Figure 7:
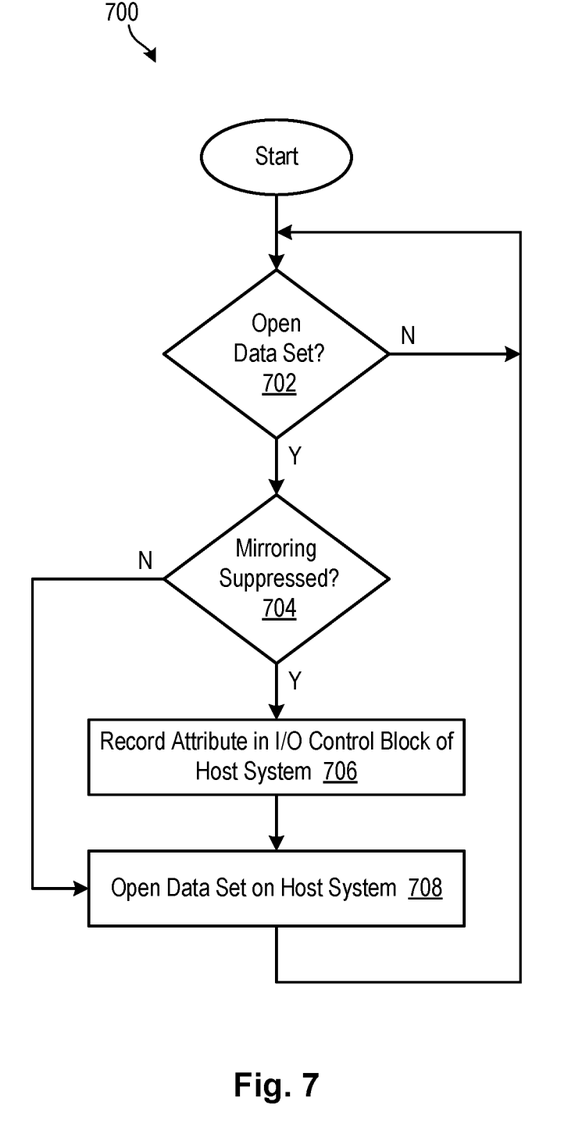
FIG. 7 is a flow diagram showing one embodiment of a method for opening a data set for which data mirroring is to be suppressed.

FIG. 7 is a flow diagram showing one embodiment of a method 700 for opening a data set 408a for which data mirroring is suppressed. This method 700 may, in certain embodiments, be executed by a host system 306 when opening data sets 408. As shown, the method 700 initially determines 702 whether to open a data set 408 on a host system 306. If a data set 408 is to be opened, the method 700 determines 704 whether data mirroring is suppressed for the data set 408. This may be accomplished by examining the attribute 410 (or lack thereof) in a VTOC 406 and/or catalog 404 that references the data set 408. If the attribute 410 is present (i.e., the attribute value associated with the attribute 410 is set to suppress data mirroring), the method 700 records 706 the attribute 410 in an I/O control block 402 of the host system 306 and the method 700 opens 708 the data set 408 on the host system 306. On the other hand, if the attribute 410 is not present at step 704, the method 700 simply opens 708 the data set 408 on the host system 306 without recording any attribute 410 in the I/O control block 402.

Figure 8:
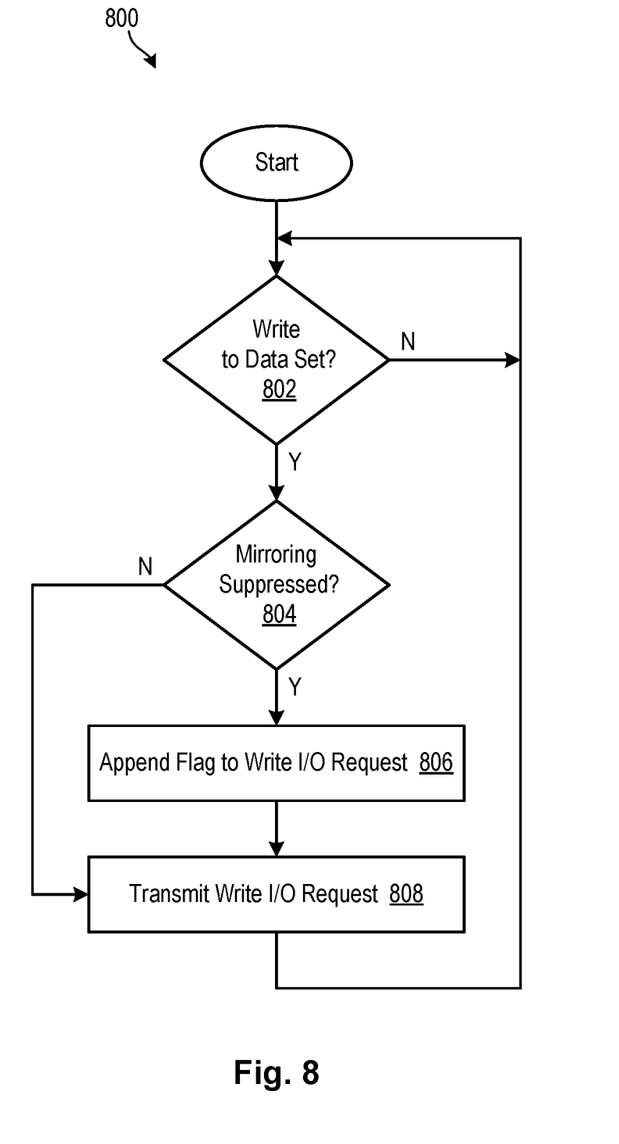
FIG. 8 is a flow diagram showing one embodiment of a method for suppressing data mirroring for write data associated with an I/O request.

FIG. 8 is a flow diagram showing one embodiment of a method 800 for suppressing the mirroring of write data associated with an I/O request 500. This method 800 may, in certain embodiments, be executed by a host system 306 when writing to suppressed data sets 408a. As shown, the method 800 initially determines 802 whether there is a pending write to an open data set 408. If so, the method 800 determines 804 whether data mirroring is suppressed for the data set 408. This may be accomplished by looking for the attribute 410 in the I/O control block 402 associated with the data set 408. If the attribute 410 is present, the method 800 appends 806 a flag 502 to the write I/O request 500 that indicates that data mirroring should be suppressed for the associated write data, and then transmits 808 the write I/O request 500 to the primary storage system 304a. The primary storage system 304a may receive the write I/O request 500 and, by virtue of the included flag 502, know to write the data to the primary storage system 304a without mirroring the write data to the secondary storage system 304b.

The disclosed systems and methods may be used in data replication environments with more than two storage systems 304. For example, in certain embodiments, a secondary storage system 304b may mirror data to a tertiary storage system and the systems and methods disclosed herein may be used to suppress mirroring of write data from the secondary storage system 304b to the tertiary storage system for selected data sets 408. In another example, a primary storage system 304a may mirror write data to both a secondary storage system 304b and a tertiary storage system. The systems and methods disclosed herein may be used to suppress mirroring of write data for selected data sets 408 to either or both of the secondary storage system 304b and tertiary storage system. Thus, the systems and methods disclosed herein may be used with various data mirroring environments, particularly asynchronous data mirroring environments, other than that illustrated in FIG. 3.

Systems and methods in accordance with the invention may eliminate or reduce the need to create separate storage pools (i.e., groups of logical volumes) for data sets 408 in order to avoid mirroring data associated with the data sets 408. This enables suppressed data sets 408a and non-suppressed data sets 408b to be intermingled with one another on the same volumes 304 or storage pools, thereby simplifying storage management while at the same time preserving bandwidth between a primary storage system 304a and secondary storage system 304b. The disclosed systems and methods also enable more fine-grained data mirroring suppression (i.e., suppression at the data set level as opposed to at the level of a logical volume or storage pool).

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for suppressing the mirroring of data between a primary storage system and a secondary storage system, the method comprising:
defining a data class with an attribute designed to suppress mirroring of data from a primary storage system to a secondary storage system;
assigning a data set to the data class, thereby causing the data set to inherit the attribute;
automatically suppressing mirroring of the data set from the primary storage system to the secondary storage system in accordance with the attribute;
generating a write I/O request to write to the data set on the primary storage system; and
setting an indicator in the write I/O request to indicate that data written to the data set is not to be mirrored from the primary storage system to the secondary storage system.

2. The method of claim 1, wherein assigning the data set to the data class comprises recording the attribute in at least one of a volume-table-of-contents (VTOC) and a catalog used to index the data set.

3. The method of claim 1, wherein the volume also stores data sets that do not have the attribute.

4. The method of claim 1, further comprising reporting how much bandwidth is preserved by suppressing the mirroring of data from the primary storage system to the secondary storage system.

5. The method of claim 1, further comprising tracking how many write requests have had their mirroring suppressed over a specified period of time.

6. The method of claim 1, wherein the indicator is in a prefix of the write I/O request.

7. The method of claim 1, further comprising, upon opening the data set by a host system, recording the attribute in a control block of the host system.

8. A computer program product for suppressing the mirroring of data between a primary storage system and a secondary storage system, the computer program product comprising a non-transitory computer-readable storage medium having computer-usable program code embodied therein, the computer-usable program code configured to perform the following when executed by at least one processor:
define a data class with an attribute designed to suppress mirroring of data from a primary storage system to a secondary storage system;
assign a data set to the data class, thereby causing the data set to inherit the attribute;
automatically suppress mirroring of the data set from the primary storage system to the secondary storage system in accordance with the attribute;
generate a write I/O request to write to the data set on the primary storage system; and
set an indicator in the write I/O request to indicate that data written to the data set is not to be mirrored from the primary storage system to the secondary storage system.

9. The computer program product of claim 8, wherein assigning the data set to the data class comprises recording the attribute in at least one of a volume-table-of-contents (VTOC) and a catalog used to index the data set.

10. The computer program product of claim 8, wherein the volume also stores data sets that do not have the attribute.

11. The computer program product of claim 8, wherein the computer-usable program code is further configured to report how much bandwidth is preserved by suppressing the mirroring of data from the primary storage system to the secondary storage system.

12. The computer program product of claim 8, wherein the computer-usable program code is further configured to track how many write requests have had their mirroring suppressed over a specified period of time.

13. The computer program product of claim 8, wherein the indicator is in a prefix of the write I/O request.

14. The computer program product of claim 8, wherein the computer-usable program code is further configured to, upon opening the data set on a host system, record the attribute in a control block of the host system.

15. A system for suppressing the mirroring of data between a primary storage system and a secondary storage system, the system comprising:
at least one processor;
at least one memory device operably coupled to the at least one processor and storing instructions for execution on the at least one processor, the instructions causing the at least one processor to:
define a data class with an attribute designed to suppress mirroring of data from a primary storage system to a secondary storage system;
assign a data set to the data class, thereby causing the data set to inherit the attribute;
automatically suppress mirroring of the data set from the primary storage system to the secondary storage system in accordance with the attribute;
generate a write I/O request to write to the data set on the primary storage system; and
set an indicator in the write I/O request to indicate that data written to the data set is not to be mirrored from the primary storage system to the secondary storage system.

16. The system of claim 15, wherein assigning the data set to the data class comprises recording the attribute in at least one of a volume-table-of-contents (VTOC) and a catalog used to index the data set.

17. The system of claim 15, wherein the volume also stores data sets that do not have the attribute.

18. The system of claim 15, wherein the instructions further cause the at least one processor to report how much bandwidth is preserved by suppressing the mirroring of data from the primary storage system to the secondary storage system.

19. The system of claim 15, wherein the instructions further cause the at least one processor to track how many write requests have had their mirroring suppressed over a specified period of time.

20. The system of claim 15, wherein the instructions further cause the at least one processor to, upon opening the data set on a host system, record the attribute in a control block of the host system.

* * * * *